March 18, 1941. E. W. HEROLD 2,235,498
ELECTRON DISCHARGE DEVICE
Filed Jan. 11, 1940  4 Sheets-Sheet 1

INVENTOR.
EDWARD W. HEROLD
BY Charles McClair
ATTORNEY.

March 18, 1941.  E. W. HEROLD  2,235,498

ELECTRON DISCHARGE DEVICE

Filed Jan. 11, 1940  4 Sheets-Sheet 2

INVENTOR.
EDWARD W. HEROLD
BY Charles McClair
ATTORNEY.

March 18, 1941.  E. W. HEROLD  2,235,498
ELECTRON DISCHARGE DEVICE
Filed Jan. 11, 1940  4 Sheets-Sheet 3

INVENTOR.
EDWARD W. HEROLD
BY Charles McClair
ATTORNEY.

March 18, 1941.  E. W. HEROLD  2,235,498
ELECTRON DISCHARGE DEVICE
Filed Jan. 11, 1940  4 Sheets—Sheet 4

INVENTOR.
EDWARD W. HEROLD
BY Charles McClair
ATTORNEY.

Patented Mar. 18, 1941

2,235,498

UNITED STATES PATENT OFFICE 2,235,498

ELECTRON DISCHARGE DEVICE

Edward W. Herold, Verona, N. J., assignor to Radio Corporation of America, a corporation of Delaware Application January 11, 1940, Serial No. 313,381

19 Claims. (Cl. 250—27.5)

My invention relates to electron discharge devices, more particularly to such devices intended to be used at high frequencies and circuits therefor.

The conventional amplifier tube having the usual cathode, control grid and anode, at high frequencies exhibits a grid loss caused by the finite transit time of the electrons across the interelectrode space. This grid loss, expressed as a conductance, increases approximately with the square of the frequency and is the limiting factor in amplifier operation at the higher frequencies. The practicable solution to this problem has been to reduce the spacing between the grid electrodes to a point which extends the frequency range of operation of the tube to the desired limit. This method, however, is limited due to the mechanical difficulty of manufacturing such a tube to specified electrical tolerances. In addition, this close spacing, although it increases the transconductance somewhat, also increases the capacitance between the electrodes.

It is, therefore, the principal object of my invention to provide an electron discharge device particularly suitable for use at high frequencies and in which losses due to transit time effects of the electrons at these high frequencies are decreased to a negligible amount or substantially eliminated.

It is a further object of my invention to produce such a tube in which close spacings of the electrodes are avoided, thus maintaining the low interelectrode capacitance of the conventional type tubes, but at the same time, permitting the attainment of a high transconductance.

Figure 3:
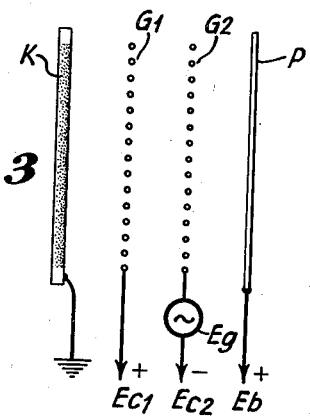
Figure 4:
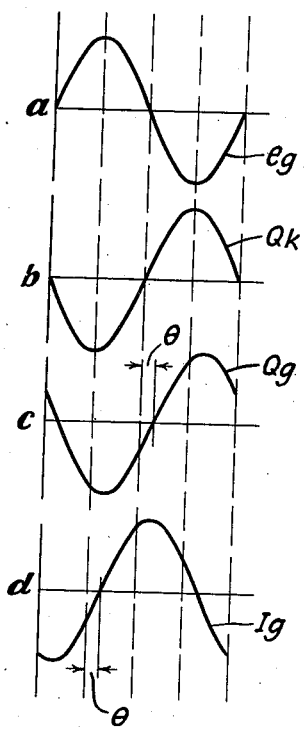
Figure 5:
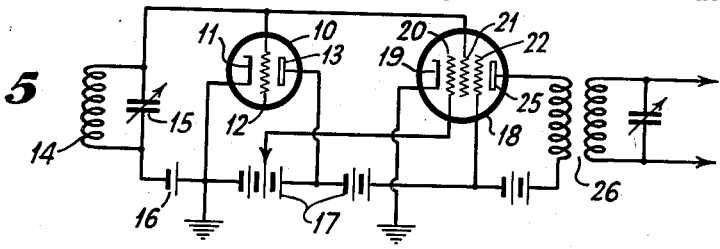
Figure 6:
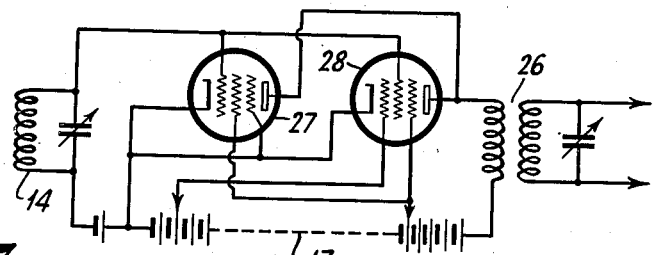

The novel features which I believe to be characteristic of my invention are set forth with particularity in the appended claims, but the invention itself will best be understood by reference to the following description taken in connection with the accompanying drawings in which Figures 1 to 4 inclusive are diagrams illustrating the problem which my invention solves and the principle employed in electron discharge devices made according to my invention, Figures 5 and 6 are circuit diagrams in which electron discharge devices are connected to produce my invention, and the remaining figures are longitudinal and transverse sections of various electron discharge devices made according to my invention and shown diagrammatically.

As pointed out above, electronic amplifiers which operate in a satisfactory manner at broadcasting frequencies begin to lose their effectiveness as the frequency approaches the high frequency end of the radio spectrum. There are several factors responsible for this, the most important probably being the effect of the transit time of the electrons from the cathode to the other electrodes within the tube.

At sufficiently high frequencies the internal input impedance of an amplifier tube having a negatively biased grid is substantially lower than is the case at lower frequencies. This comes about not only because the internal capacitance between cathode and grid presents a lower impedance the higher the operating frequency, but also because there is work done by the grid on the electrons moving from cathode to anode. The effective internal impedance of the tube can be represented as a capacitance shunted by a resistance. This resistance decreases as the frequency is raised, chiefly because of the increased work which the grid performs on the electrons traversing the region in which the electrons are at least partially imaged in the grid electrode. It is this decrease in the shunting resistance which partially accounts for the loss in effectiveness at high frequencies. That is, the energy required to excite the tube becomes comparable to the output energy so that the gain is substantially reduced.

Figure 1:
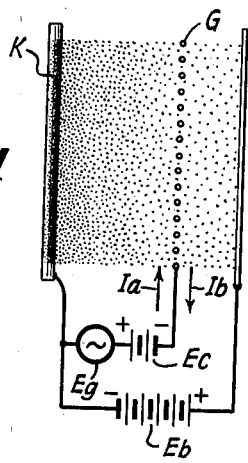
Figure 2:
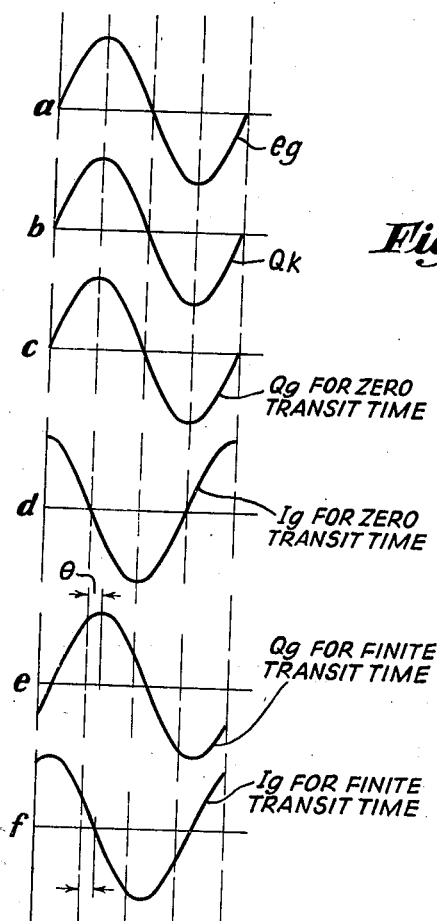

A better understanding of this action may be had by reference to Figures 1 and 2. It is convenient to discuss the input loading of a tube in terms of tube conductance rather than resistance.

For an explanation of the increase in conductance, due to electron transit time, it is helpful to consider the concept of current flow to an electrode in a tube. It is customary to consider that electron current flows to an electrode only when electrons strike the surface of the electrode. This concept, while valid for static conditions, fails to account for observed high frequency phenomena. A better concept is that, in a diode for example, plate current starts to flow as soon as electrons leave the cathode. Every electron in the space between cathode and plate of a diode induces a charge on the plate; the magnitude of the charge induced by each electron depends on the proximity of the electron to the plate. Because the proximity changes with electron motion, there is a current flow to the plate through the external circuit due to the motion of electrons in the space between the cathode and plate.

Consider the action of a conventional space-charge-limited triode as shown in Figure 1. In this triode, the plate P is positive with respect to cathode K and the grid G is negatively biased. Due to the motion of electrons between cathode and grid and the resulting induced charge, there is a current $I_a$ flowing into the grid. In addition, there is another current $I_b$ flowing out of the grid due to the motion of electrons between grid and plate receding from the grid. When no alternating voltage is applied to the grid, $I_a$ and $I_b$ are equal and the net grid current ($I_g$) is zero.

Suppose, now, that a small alternating voltage ($e_g$) is applied to the grid. Because the cathode has a plentiful supply of electrons, the charge ($Q_k$) represented by the number of electrons released by the cathode varies with the grid voltage and is, therefore, in phase with it as shown in Figures 2a and 2b. The charge ($Q_g$) induced on the grid by these electrons would also be in phase with the grid voltage if the charges released by the cathode were to reach the plane of the grid in zero time, as shown in Figure 2c. In this hypothetical case, the grid current due to this induced charge (Figure 2d) leads the grid voltage by 90 degrees, because by definition, current is the time rate at which a charge passes a given point. However, the charge released by the cathode actually propagates toward the grid with finite velocity; therefore, maximum charge is induced on the grid at a time later than that corresponding to maximum grid voltage, as shown in Figure 2e. This condition corresponds to a shift in phase by an angle $\theta$ of $Q_g$ with respect to $e_g$; hence, the grid current lags behind the capacitive current of Figure 2d by an angle $\theta$, as shown in Figure 2f. Clearly the angle $\theta$ increases with frequency and with the time of transit $\tau$. Expressed in radians, $\theta = \omega \tau$.

It can be shown mathematically and vectorially that this charging grid current is made up of two components, one 90° leading the grid voltage $e_g$ and one in phase with the voltage $e_g$. It is this in-phase component or the charging current in the control grid that causes a loss in the grid circuit. By definition, power is equal to the product of the voltage and the component of the current which is in phase with it, and hence is equal to grid voltage $e_g$ and the component of the grid current in phase with this voltage. It will also be apparent from the above consideration that the higher the frequency and hence the greater the lag in the current $I_g$, the greater will be the in-phase component of the grid current and hence the greater the loss in the grid circuit. This may be looked upon as a decrease in the impedance of the input of the tube or as an increase in the conductance. That is, the action is somewhat similar to that of placing a resistor of decreasing value across the terminals of the input circuit as the frequency increases so that very little voltage can be built up across the input circuit for controlling the tube. Another way of looking at the loss is that the electrons possess mass, and, as is well known, the greater the acceleration of a given mass the greater the power required for the moving of the mass. As the frequency increases the energy drawn from the grid circuit for accelerating electrons a given amount is greater and greater. When the energy available is limited, the electron motion is, therefore, reduced and a loss in control voltage results as the frequency increases. In other words, the energy derived from the input signal, which in normal operation could be utilized entirely for building up the voltage on the input circuit, is now absorbed to a greater and greater extent by the electrons as the frequency of operation increases. It has also been found that this increase in conductance due to the electron transit time varies with the square of the frequency.

A positive value of input conductance due to transit time, signifies that the signal source is supplying energy to the grid. This energy is used in accelerating electrons toward the plate and manifests itself in heating the plate. A positive input conductance will decrease the gain and selectivity of the input circuit or of a preceding stage.

The above explanation is based on a space-charge-limited tube, and shows how a positive input conductance can result from the induced charge. The input conductance due to induced grid charge is negative in a tube which operates as a temperature-limited tube, that is, as a tube where cathode emission does not increase when the potential of other electrodes in the tube is increased. The emission of a tube operating with reduced filament voltage is temperature limited; a tube with a positive or accelerating grid interposed between cathode and the control or signal grid acts as a temperature-limited tube when the accelerating grid potential is reasonably high. This positive or accelerating grid adjacent the cathode is also referred to as a space charge grid and may be defined as a grid which is placed adjacent to the cathode and positively biased so as to reduce the limiting effect of space charge on the current through the tube. The existence of a negative input admittance in such a tube can be explained with the aid of Figures 3 and 4 showing a space charge grid tube and a graph of electrical conditions in the tube.

When the value of $E_{c2}$ in Figure 4 is sufficiently high, the voltage $E_{c1}$ being a fixed positive voltage on grid $G_1$, the current drawn from the cathode divides between $G_1$ and plate; any change in one branch of this current is accompanied by an opposite change in the other. As a first approximation, therefore, it is assumed that the current entering the space between $G_1$ and $G_2$ is constant and equal to $\rho v$, where $\rho$ is the density of electrons and $v$ is their velocity. $G_1$ may now be considered as the source of all electrons passing to subsequent electrodes.

Suppose, now, that a small alternating voltage is applied to grid $G_2$, as shown in Figure 4. During the part of the cycle when $e_g$ is increasing, the electrons in the space between $G_1$ and $G_2$ are accelerated and their velocities are increased. Because the current ($\rho v$) is a constant, the density of electrons ($\rho$) must decrease. As pointed out above in connection with Figures 1 and 2, the charge $Q_k$ is represented by the number of electrons released by the cathode, which in a space charge limited tube varies with the grid voltage. In other words, the greater the voltage the greater the current density and hence the greater the charge. This charge of the electron cloud is reflected in the grid, which reflected charge is represented by $Q_g$. However, in the case of a temperature limited or space charge grid tube, the total current available is constant. Thus the result of an increased voltage on the control grid is to accelerate electrons between the space charge grid and the control grid, but since the total current is represented by the product of the density and the velocity, and since the velocity increases, the density of the electron cloud between the space charge grid and control grid decreases. As pointed out in connection with space charge limited tubes, the charge represented by the electrons depends upon the density of the electron stream. If this density decreases the charge decreases and since the density decreases with the increase in voltage on the control grid in a space charge grid tube, the charge moving toward the grid between the space charge grid and control grid also decreases, reaching a minimum when the control grid voltage reaches a maximum positive value. It is for this reason that a space charge grid tube or a temperature limited tube displays a negative conductance characteristic instead of a positive conductance characteristic. In this case, therefore, the charge of $G_1$ is 180 degrees out of phase with the grid voltage, as shown at $a$ and $b$ of Figure 4. This diminution in charge propagates toward the plate with finite velocity and induces a decreasing charge on the grid. Because of the finite velocity of propagation, the maximum decrease in grid charge occurs at a time later than that corresponding to the maximum positive value of $e_g$, as shown in Figure 4c. The current, which is the derivative of $Q_g$ with respect to time, is shown in Figure 4d. If there were no phase displacement $(\theta=0)$, this current would correspond to that caused by a negative capacitance; the existence of a transit angle $\theta$, therefore, corresponds to a negative conductance.

In the second arrangement where a space charge grid is used between the control grid and cathode, it can be shown mathematically and graphically that the grid current comprises a component 90° lagging of the grid voltage $e_g$ and a component 180° out of phase with the grid voltage. Thus, when the instantaneous voltage has a positive value the component 180° out of phase has a negative value and when the instantaneous voltage is negative the out of phase component is positive. Since power is represented by the product of the voltage and the component 180° out of phase with the voltage, the power is represented by a negative sign which indicates that energy is delivered to the grid circuit rather than being extracted from the grid circuit. Thus a negative value of input conductance due to transit time signifies that the input circuit is receiving energy from the anode supply. As the frequency increases this 180° out of phase component becomes greater so that more and more energy is delivered to the grid circuit. This negative value may increase the gain and selectivity of a preceding stage and if this negative value becomes too large it may cause oscillation, since more energy is being delivered to the grid circuit than is lost in the grid circuit.

From the above, therefore, it appears that the negative loading will ocur when the total current is limited as it is by a positive space charge grid and when the electrons actually pass through the control grid. It can also be shown that electrons turned back before reaching the control grid will not contribute to the negative results. According to my invention I make use of the positive and negative loadings so that the net loading, which is the result of the combination of the positive and negative loadings, can be made positive, zero or negative depending on the conditions.

It should be noted that in this discussion no mention has been made of the effect of the electrons between the grid and plate. However, the effect of these electrons is similar to the effect of electrons between the grid and cathode. Therefore, the effect can be considered as included in the above discussion.

My invention makes use of the phenomena discussed above to neutralize input loading at high frequencies. One embodiment of my invention is shown incorporated in a circuit using conventional tubes and schematically shown in Figures 5 and 6. In Figure 5 the basic circuit makes use of two separate tubes or mounts connected in parallel. Tube 10 is a conventional triode having cathode 11, control grid 12 and anode 13. This tube will, therefore, exhibit positive loading in the usual way as described above. The input circuit comprising an inductance 14 and capacitance 15 is connected between the control grid 12 and cathode 11, a battery or source of voltage supply 16 providing the usual negative bias for the control grid and the voltage source 17 the usual positive voltage required for the anode. The second tube 18 is provided with the cathode 19, positively biased space charge grid 20, control grid 21, suppressor 22 and anode 25. The second tube being a space charge grid type exhibits a negative input loading and its grid is connected in parallel with grid 12 of the first tube. The output is fed to the output circuit 26 connected to anode 25. In this arrangement the tube with the positive loading, that is tube 10, is used only to cancel the loading of the second tube 18. In this way it is possible to provide a circuit which can be used up to a very high frequency but in which the positive loading is neutralized by the negative loading of a space charge grid tube.

In Figure 6 a somewhat different arrangement is shown in which a pair of pentodes are connected in parallel, one tube 27 being connected to have a positive grid loading and tube 28 to have a negative grid loading, the input circuit 14 being connected between the control grids and cathodes of the tubes, and the output circuit 26 between the anodes and the source of voltage supply 17.

While it is possible to practice my invention with conventional tubes connected in an unconventional manner, I prefer to provide a tube in which the negative and positive loading characteristics can be controlled and combined within a single tube envelope.

Figure 7:
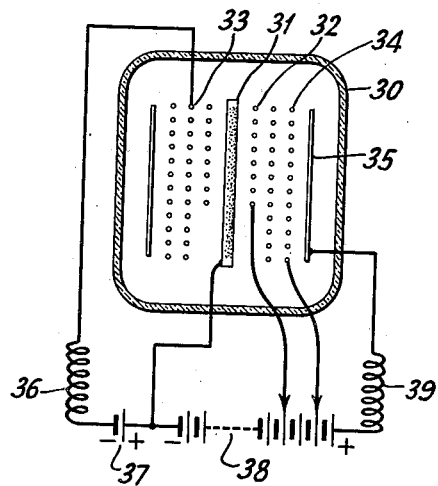

In Figure 7 is shown a vertical section of one form of tube made according to my invention and having both positive and negative loading. It comprises an envelope 30 containing the cathode 31, space charge grid 32, control grid 33, screen grid 34 and anode 35. The input circuit 36 is connected between control grid 33 and cathode 31, the biasing voltage source 37 providing the necessary negative bias for the control grid 33 and voltage source 38 providing the necessary positive bias for the space charge grid 32 and the screen grid 34, the anode 35 being connected to the load 39.

In this tube the upper portion is essentially a space charge grid tube and exhibits a negative loading. The short space charge grid does not extend into the lower section so that the latter portion is a normal tetrode with a positive loading.

Figure 8:
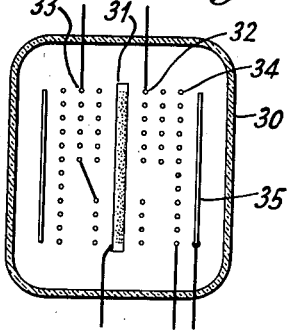
Figure 9:
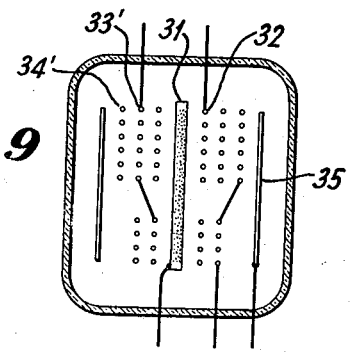

Figures 8 and 9 show modifications which are extensions of the construction shown in Figure 7, the control grid 33' having an offset lower portion lying in the same cylindrical surface as the space charge grid 32. In Figure 9 the control grid 33' and the screen grid 34' each has a lower portion lying more closely adjacent to the cathode, the lower portion of the control grid lying in the same cylindrical surface as the space charge grid 32 and the lower portion of the screen grid lying in the same cylindrical surface as the control grid 33'. It is of course understood that the same circuit connections are made to the tube in Figures 8 and 9 as in Figure 7.

Figure 10:
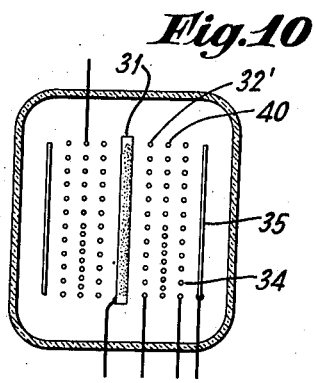

In Figure 10 is shown a still further modification of a tube made in accordance with my invention. Here the space charge grid 32' is coextensive with the entire emitting surface of the cathode 31. In this case, however, the control grid 40 is made with the lower portion in which the grid wires are closely spaced so as to offer considerable impediment to electrons flowing from the cathode to the anode 35. The portion in which the grid pitch is decreased, that is the number of turns increased, will turn back a major part of the electrons arriving at this portion. As a result, this portion will have positive loading while the upper portion will have negative loading as hereinbefore stated. It is, of course, understood that the variation of pitch of the signal grid could equally well be at the center or any other portion of the mount as where it is shown.

Figure 11:
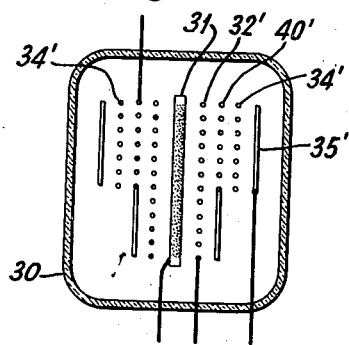
Figure 12:
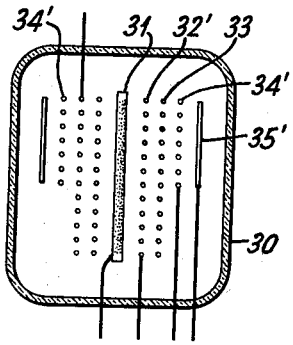
Figure 13:
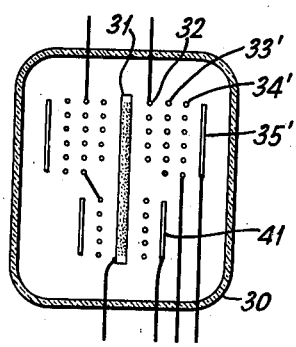
Figure 14:
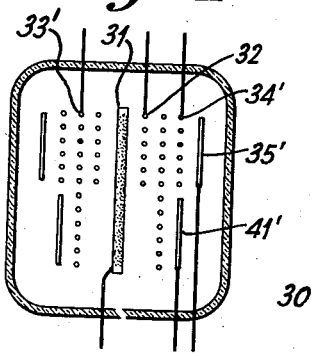

Further, as shown in Figure 11 the lower portion of the signal grid 40' could be made of a solid band, thus closing it up altogether, the screen grid 34' and anode 35' being shortened so that no overlap of the control grid 40' exists. A further extension of the same idea is shown in Figure 12. In this figure the space charge grid 32' and a signal grid 33 are coextensive with the cathode emitting surface. The tube is also provided with a short screen grid 34' and a short plate 35'. Since the lower portion of the signal grid 33 has no accelerating field on the side away from the cathode, a majority of electrons approaching it are turned back. The loading of this portion of the tube is, therefore, positive.

Where it is not desired to use the positive loading portion for amplification as in Figures 11 and 12, the type of tube shown in Figures 13 and 14 can also be used. Here the control grid 33' is provided with a lower portion of smaller diameter which lies in the same cylindrical surface as the space charge grid 32, an auxiliary anode 41 serving to collect the electrons emitted by the lower portion of the cathode. In the modification shown in Figure 14 the control electrode 33 extends along the whole surface of the emitting portion of the cathode, and the auxiliary anode 41' is shown lying in the same cylindrical surface as the screen grid 34'. It may, in fact, be electrically connected to grid 34'.

Figure 15:
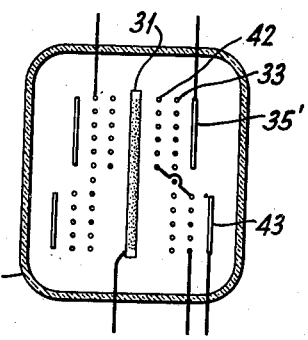
Figure 16:
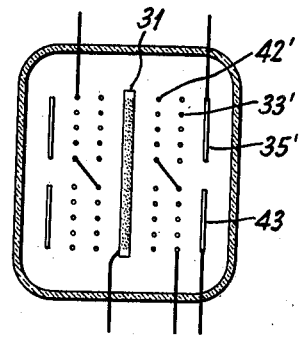
Figure 17:
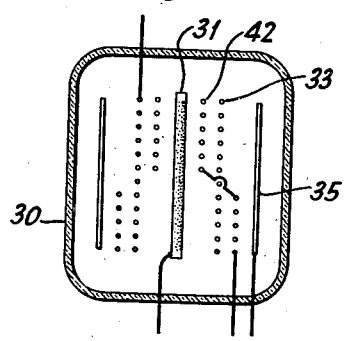

In the forms shown in Figures 15, 16 and 17 the major portion of the amplification may occur in the upper positive loading portion of the tube, and the lower portion may be used merely to reduce the total loading. The tubes otherwise may function in the same manner as the tubes described above. As shown, however, the positive loading occurs in the lower portion of the tube. In Figure 15 the space charge grid 42 is provided with a lower portion of larger diameter acting as a screen grid for the lower portion of the tube mount, the control electrode 33 extending along the entire length of the emitting section of the cathode. An output anode 43 surrounds and is concentric with the screen grid portion of the space charge grid 42 which lies in the same cylindrical surface as the auxiliary anode at 35'. The variations shown in Figures 16 and 17 are self-explanatory in view of the description above.

The difference between them is that in Figure 16 the signal grid 33' is provided with a lower portion of decreased diameter and the space charge grid with an increased diameter at its lower portion whereas in Figure 17 the signal grid 33 is of the same diameter throughout.

Figure 18:
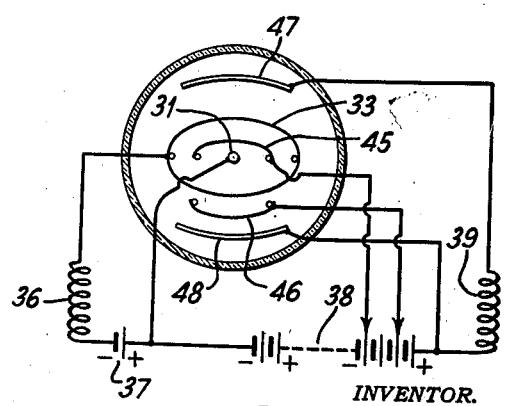

In the constructions so far described the mounts are made with the positive and negative loading parts along different axial sections of the cathode. The tubes can be modified so that the two portions of the tube, that is the positive and negative loading portions are placed along different circumferential portions of the cathode. Such an arrangement is shown for example in Figure 18 which corresponds in function to the tube shown in Figure 16. In this arrangement the cathode 31 is surrounded by the control grid 33. One-half of the tube is provided with the space charge grid 45 and the other the screen grid segment 46, the tube being provided with the separate anode segment 47 which is the anode for the output portion of the tube having a negative loading characteristic and the anode segment 48 being the anode segment for that portion of the tube displaying a positive loading characteristic.

Figure 19:
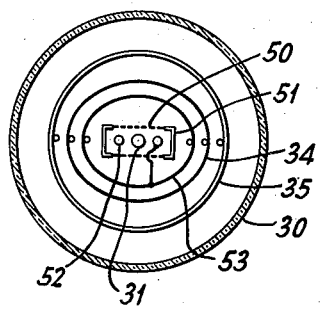

Figure 19 corresponds in function to Figure 13. Here the cathode 31 is surrounded by a space charge grid 50 supported from the channel members 51. Within the space charge grid are the signal control rods 52 electrically connected to the signal grid 53 surrounding the cathode and signal control rods. The screen grid 34 and anode 35 surround the other electrodes. All are mounted within the exhausted envelope 30.

The above constructions have been limited to the use of essentially separated electron streams for the negative and positive loading portions. I have found it is also possible to combine loading effects of electrons by operating on the same electron stream.

I found that when one negative electrode operating on an electron stream is connected to a second such electrode in the same stream but positioned farther away from the electron source, the combined conductance of the two electrodes is quite different from the sum of the individual conductances taken on each electrode with the other one at A. C. ground. The combined conductances of two such connecting electrodes separated by a fixed potential positive electrode may be a large positive quantity even though one of the electrodes by itself has a small positive conductance and the other electrode by itself has a small negative conductance. It is, therefore, possible to substantially neutralize the negative conductance of an electrode by only a very small amount of control by an additional electrode connected to it and preceding it in an electron stream. The reasons why this is so will be better understood by first referring to the embodiments of my invention described below.

Figure 20:
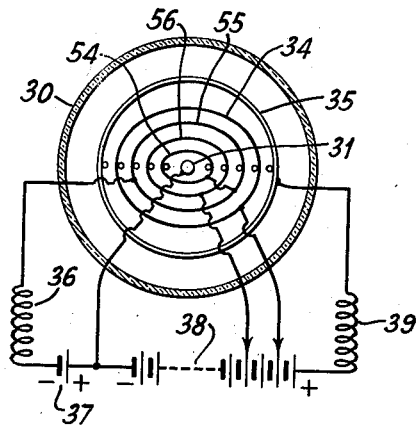

In Figure 20 is a transverse section of an electron discharge device and circuit and embodying a specific form of tube in which the control is on the same electron stream. As shown the control grids 54 and 55 are electrically connected together, the space charge grid 56 being interposed between the other two grids. The tube is provided with the usual screen grid 34 and anode 35. In this arrangement when the two control grids, that is, grids 54 and 55, are correctly proportioned, a tube with approximately infinite input resistance and high transconductance will result. The No. 1 grid pitch will usually be very coarse and in some cases it may be sufficient to use only the two side rods of such a grid with no wires as shown in Figure 21.

Figure 21:
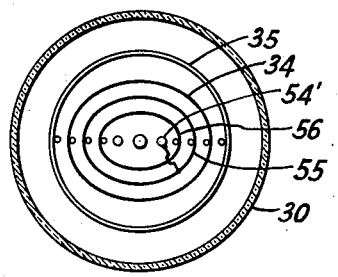
Figure 22:
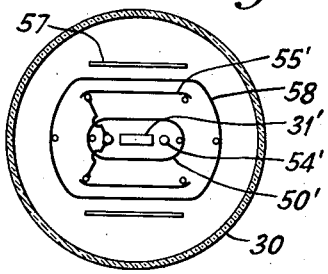

In Figure 22 is shown a further modification of the construction shown in Figure 21. Here the outer signal grid 55' is divided into two sections to lower the input capacitance of the tube and the cathode 31' is made rectangular shape in cross section, the anodes 57 being flat plates, the space charge grid 50' and the screen grid 58 being shaped to accommodate the flat cathode and the separated portions of the other sections of the control grid.

Figure 23:
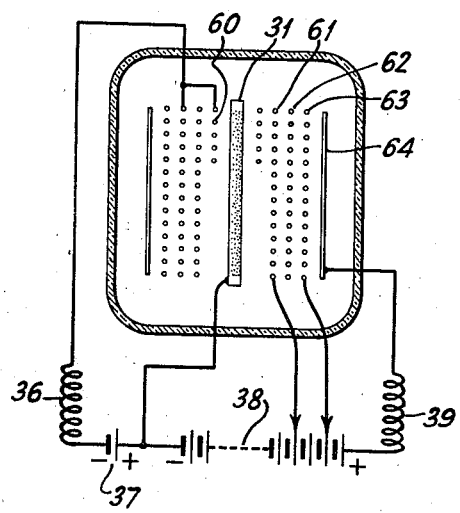

In Figure 23 is shown a modification of the tube construction using two control grids interconnected and lying in the same electron stream and its associated circuit. Here the first control grid 60 extends along a limited portion of the cathode surface. This is followed by a space charge grid 61 extending the entire length of the cathode, the second control grid 62 electrically connected to the grid 60, the screen grid 63 and the anode 64. By correct proportioning of the pitch of the grids the upper section of the mount may be made to have a loading predominantly positive. The lower section can then be designed to be predominantly negative. It will usually be found that a very short length of grid 60 (sometimes only one or two turns) will produce sufficient positive loading to substantially reduce the negative loading of the remaining portion of the mount.

Figure 24:
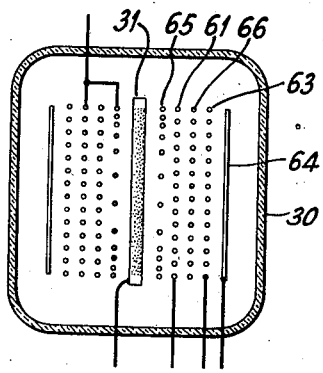

In Figure 24 a flexible construction from a design standpoint of view is disclosed in which the variable pitch No. 1 grid 65 is connected to the No. 3 grid or grid 66 and may be uniform or of variable pitch. The space charge grid 61 is placed between these two signal grids, and the screen grid 63 and the anode 64 occupy the same positions as indicated in Figure 23. With this construction it is possible to design a tube having a high input resistance over a wide range of operating voltages.

Referring to Figure 23, the short portion of the control electrode 60 adjacent the cathode will exhibit positive conductance characteristics as is to be expected. The outer portion 62, coextensive with the cathode and following the space charge grid 61, will exhibit a negative conductance characteristic which is most strong over that portion registering with the cathode over which the shorter portion 60 of the control grid does not extend. By connecting these two electrodes together it is possible to obtain the desired characteristic of positive, negative or substantially zero conductance. Thus in the upper portion of the tube the electron current approaching the second of the two control electrodes is already modulated while that in the lower portion of the tube is not. In Figure 24, however, both the portion 65 and the portion 66 extend along the whole surface of the cathode. However, due to the wide spacing between turns in the grid 65 adjacent the middle portion of the cathode, the electron stream is only slightly modulated so that the maximum control is effected by the outer portion 66. Since this portion exhibits a negative conductance characteristic this portion of the electron stream will result in a negative conductance characteristic while the other portions will result in positive characteristics. Thus by varying the effective control of the two interconnected grids the resulting characteristic of the tube so far as conductance is concerned can be controlled as desired. Normally the first control grid 65 will be designed to exert less control over the electron stream than the second or outside portion 66 so that a negative conductance effect will produce a net characteristic less positive than would otherwise result.

It is pointed out that the cancellation of positive and negative loadings in the manner described is one of degree and any of the constructions shown may be used not only to completely cancel loading effects but also merely for the reduction of loading to a more desirable value. It has been observed that input capacitance changes with the space charge, hence capacitance changes go hand in hand with the loading effects. Thus the structures shown for the reduction of loading in the present application will also be applicable to the reduction of input capacitance changes with space charge; that is, for example, when automatic volume control is used.

It is of course obvious that modifications and additions can be made to the various structures shown which will alter the physical appearance and number of electrodes without in any way altering the general principles involved. For example, the addition of suppressor grid, additional current controlling grids for volume control or other purposes, or the addition of different well known grid and cathode shapes are obvious modifications which should be used in adapting the principles to a particular manufacturing technique or to a particular commercial application.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. An electron discharge device having a cathode for providing a stream of electrons and an anode for receiving said electrons, an accelerating electrode next adjacent said cathode and between said cathode and anode effective over only a portion of the cross sectional area of the electron stream, and a signal electrode positioned between said accelerating electrode and said anode and effective over a substantially larger portion of the cross sectional area of said electron stream.

2. An electron discharge device having a cathode for providing a stream of electrons and an anode for receiving said electrons, an accelerating electrode next adjacent said cathode and between said cathode and anode effective over only a portion of the cross sectional area of the electron stream, and a signal electrode positioned between said accelerating electrode and said anode and effective over a substantially larger portion of the cross sectional area of said electron stream, and a screen grid positioned between said signal electrode and the anode.

3. An electron discharge device having a cathode and a coaxial anode surrounding said cathode, a space charge grid adjacent said cathode but extending along only a portion of the cathode surface and a control electrode surrounding said cathode and space charge grid and coextensive with the cathode surface and positioned between said space charge grid and said anode.

4. An electron discharge device having a cathode, a signal electrode adjacent but directly covering only a portion of the cathode surface, a space charge grid surrounding said cathode and signal electrode, a second signal electrode registering with the portion of the cathode not covered by said first signal grid and positioned outside said space charge grid, and an anode segment for receiving electron current from said cathode.

5. An electron discharge device having a straight thermionic cathode surrounded by a space charge grid, signal grid, screen grid and anode, said signal grid having a portion thereof in which the spacing between the grid wires is small in comparison with the rest of said signal grid so as to be substantially impervious to electrons at this portion of the signal grid.

6. An electron discharge device having a straight thermionic cathode, a segmental space charge grid covering a portion only of the cathode surface, a signal grid surrounding said cathode and space charge grid, a screen grid outside of said signal grid and registering with the portion of the surface of the cathode not covered by said space charge grid, and an anode segment registering with the space charge grid and another anode segment registering with said screen grid.

7. An electron discharge device having a cathode and an anode, a space charge electrode next adjacent to said cathode effective only over a portion of the surface of the cathode, and a signal electrode coextensive with said cathode and positioned between said space charge grid and said anode.

8. An electron discharge device having a cathode and a coaxial anode surrounding said cathode and a space charge grid positioned next to said cathode but extending over only a portion of the cathode surface, and a control grid surrounding said cathode and space charge grid and positioned between said space charge grid and said anode, and a screen grid positioned between the control grid and the anode.

9. An electron discharge device having a cathode and a coaxial anode surrounding said cathode and a space charge grid positioned next to said cathode but extending over only a portion of the cathode surface, and a control grid surrounding said cathode and space charge grid and positioned between said space charge grid and said anode, and a screen grid positioned between the control grid and the anode, said control grid being formed to have a portion lying in the surface extended of said space charge grid adjacent that portion of the cathode not covered by said space charge grid.

10. An electron discharge device having a cathode surrounded by a space charge grid, a signal grid, screen grid and anode, said signal grid being provided with a portion substantially impervious to electrons moving from the cathode to the anode.

11. An electron discharge device having a cathode surrounded by a space charge grid, a control grid, a screen grid and anode in the order named, said screen grid and anode extending over only a portion of the cathode surface.

12. An electron discharge device having a cathode surrounded by a space charge grid extending over only a portion of the surface of the cathode, and a signal grid, screen grid and anode, said anode being coextensive with said space charge grid and a second anode surrounding said signal grid and extending over only that portion of the cathode not covered by said space charge grid.

13. An electron discharge device having a cathode, a space charge grid, control grid and anode, the space charge grid and control grid being so formed that the control grid is adjacent the cathode over only a portion of its surface and the space charge grid is adjacent the cathode over the remainder of the cathode surface.

14. An electron discharge device having a cathode, a space charge grid and control grid, the space charge grid and signal grid being so formed that the signal grid is adjacent the cathode over only a portion of its surface and the space charge grid is adjacent the cathode over the remainder of the cathode surface, and separate anodes extending over the two portions of the cathode surface.

15. An electron discharge device having a cathode, a signal electrode adjacent but directly covering only a portion of the cathode surface, a space charge grid surrounding said cathode and signal electrode, a second signal electrode registering with the portion of the cathode not covered by said first signal grid and positioned outside said space charge grid, and an anode for receiving electron current from all portions of the cathode.

16. An electron discharge device having a cathode, and in the order named, a first signal grid, a screen grid at positive potential, a second signal grid and anode, said signal grids being electrically connected together.

17. An electron discharge device having a cathode and a signal electrode covering only a portion of the cathode surface, a space charge grid surrounding the cathode and signal electrode, a second signal electrode outside of said space charge grid, a screen grid and an anode, said signal grids being electrically connected together.

18. An electron discharge device having a cathode surrounded in the order named by a signal grid, space charge grid, second signal grid, screen grid and anode, and an electrical connection between said signal grids.

19. An electron discharge device having a cathode surrounded by a signal grid, space charge grid, second signal grid, screen and anode, and an electrical connection between said signal grids, the signal grid adjacent the cathode being a variable mu grid.

EDWARD W. HEROLD.

DISCLAIMER 2,235,498.—*Edward W. Herold*, Verona, N. J. ELECTRON DISCHARGE DEVICE. Patent dated March 18, 1941. Disclaimer filed January 15, 1944, by the assignee, *Radio Corporation of America*.

Hereby enters this disclaimer of claims 3 and 13 of said patent.

[*Official Gazette February 8, 1944.*]